United States Patent [19]

Luciani et al.

[11] Patent Number: 4,831,716

[45] Date of Patent: May 23, 1989

[54] INSERTING INSULATING MATERIAL INTO ELECTRIC MOTOR STATORS

[75] Inventors: Sabatino Luciani; Luciano Santandrea, both of Florence, Italy

[73] Assignee: Axis USA, Inc., Peabody, Mass.

[21] Appl. No.: 212,266

[22] Filed: Jun. 27, 1988

[51] Int. Cl.⁴ .................................. H02K 15/10
[52] U.S. Cl. ........................ 29/596; 29/564.6; 29/734
[58] Field of Search .............. 29/596, 734, 736, 564.1, 29/564.2, 564.6, 564.8, 564.7

[56] References Cited

U.S. PATENT DOCUMENTS

| | | | |
|---|---|---|---|
| 3,616,512 | 11/1971 | Appenzeller et al. | 29/734 X |
| 3,634,932 | 1/1972 | Mason | 29/596 |
| 3,702,498 | 11/1972 | Mason | 29/596 |
| 3,778,890 | 12/1973 | Schaudroff | 29/734 X |
| 3,831,255 | 8/1974 | Smith et al. | 29/734 |
| 4,136,433 | 1/1979 | Copeland | 29/564.6 |
| 4,186,478 | 2/1980 | Hamane et al. | 29/564.1 X |
| 4,433,466 | 2/1984 | Koening | 29/564.6 |
| 4,495,692 | 1/1985 | Walker | 29/564.1 |

FOREIGN PATENT DOCUMENTS

| | | | |
|---|---|---|---|
| 51858 | 5/1982 | European Pat. Off. | 29/734 |
| 80248 | 5/1982 | Japan | 29/734 |
| 658670 | 4/1979 | U.S.S.R. | 29/734 |
| 871281 | 10/1981 | U.S.S.R. | 29/564.6 |

Primary Examiner—William Briggs
Attorney, Agent, or Firm—Robert R. Jackson

[57] ABSTRACT

A machine for forming electric motor stator insulating material and inserting it vertically directly into the stator placed on the pallet of a transportation system, without removing the stator from its pallet. The machine includes a guiding system for the paper fed from a feed roll, with the following elements working in sequence: a pair of rollers for trimming the paper to the required width; a pair of paper shaping and pulling rollers, at least one of which is motor-operated and the other of which can be moved away from the first during insertion of the paper into the machine; a paper cutter operating in a substantially horizontal direction for cutting across the paper; a former for forming the cut paper inside vertical guides and operating parallel to the cutter; and an inserter for inserting the cut and bent paper into the stator slot and operating in a vertical direction moving through the paper former.

9 Claims, 2 Drawing Sheets

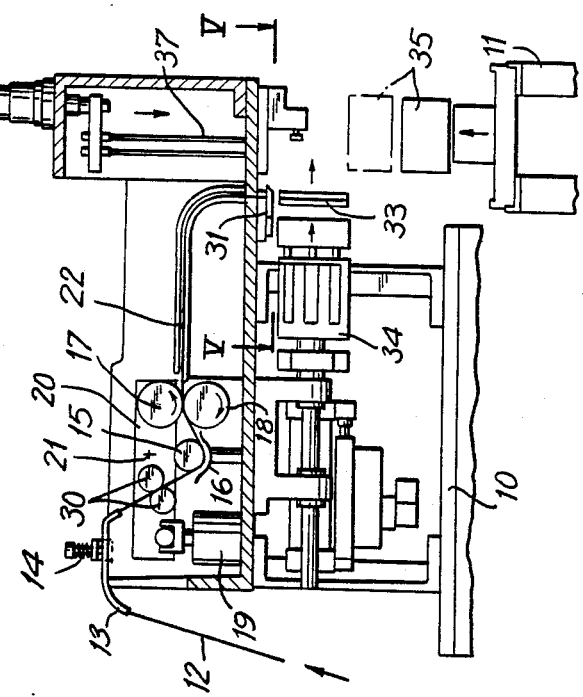
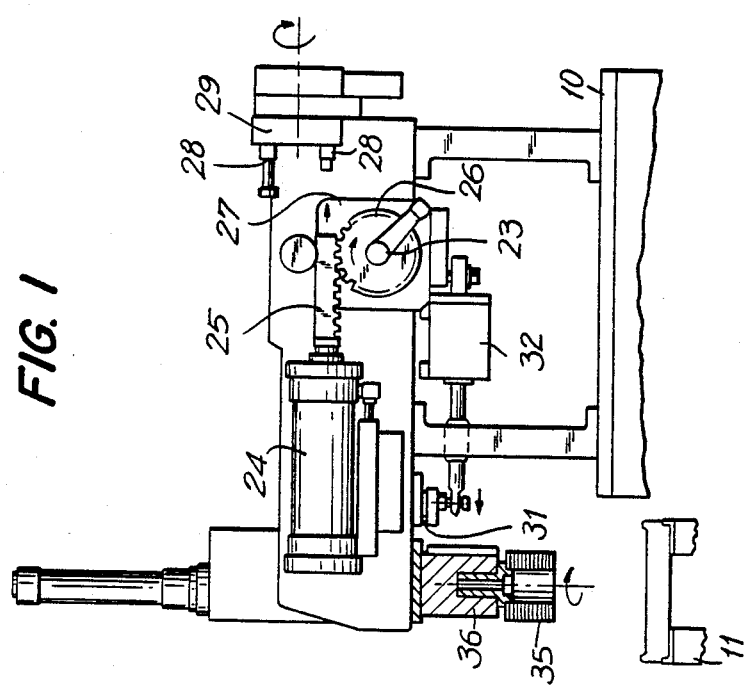

INSERTING INSULATING MATERIAL INTO ELECTRIC MOTOR STATORS

BACKGROUND OF THE INVENTION

This invention relates to a machine for shaping stator insulating paper and for vertically inserting the paper into the stator directly on the stator assembly line. In automated production lines the machines are generally served by an accumulating transportation system in order to obtain maximum efficiency. To do this, the machines are designed in the simplest possible way. Therefore, where possible, the machinings are performed directly on the transportation system The existing machines for shaping the insulating paper for stators consist of elements for the following process, in sequence:

forming the paper by passing it through properly shaped rolling dies;

cutting and shaping the paper, fed horizontally and with the cutting operation being in the vertical plane; and after cutting, shaping the paper with two operators on a vertical plane, parallel to the cutting plane.

An object of this invention is to provide a machine of the above-mentioned type, wherein, although some of the elements of existing machines are employed, the arrangement of the elements is more rational in relation to the transportation system, so that a system for transporting the paper from the shaping device to the object to be insulated (the stator) and a system for taking the stator from the transportation system to the shaping machine are not required.

Each operating element of the machine is also improved as regards functionality and ergonomic arrangement of the space, thus increasing the reliability and reducing the overall dimensions of the machine.

SUMMARY OF THE INVENTION

These and other objects of the invention are accomplished in accordance with the principles of the invention by providing a machine for forming the insulating paper for stators with vertical insertion directly on the transportation system, wherein the paper is fe from a feeding coil placed upstream of the machine, and with the following features in the sequence hereunder described:

a pair of rollers for trimming the paper to the required transverse dimension;

a pair of paper shaping and pulling rollers, at least one of which is motor-operated and the other of which can be moved away from the first one during insertion of the paper into the machine;

means for cutting the paper which operates in a substantially horizontal direction;

means for forming the cut paper inside vertical guides, operating parallel to the cutting means; and means for inserting the cut and bent paper into the stator slots, operating in a vertical direction and moving through the paper forming means.

Further features of the invention, its nature and various advantages will be more apparent from the accompanying drawings and the following detailed description of the preferred embodiments.

BRIEF DESCRIPTION OF THE DRAWINGS

FIGS. 1 and 2 are respectively elevational views (partly in section) of the two sides of the machine.

DETAILED DESCRIPTION OF THE PREFERRED EMBODIMENTS

Figure 4:
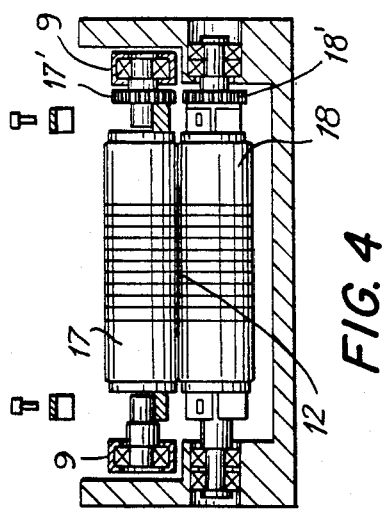
FIG. 4 is a sectional view taken along the line IV—IV in FIG. 3.

The machine is fitted to a base plate 10 which supports it and enables it to work at the height of the transfer plane of the workpiece to be processed coming from the conveyor 11.

The strip of insulating material 12 is drawn from a feeding roll (not illustrated) and is initially manually inserted onto a shaped chute 13 where it is braked by means of a felt-covered elastic presser 14 which gives to the paper the right tension and adherence to the driving rollers before shaping and possible trimming. Then, the paper strip is pushed under a guide roller 15 and, with the aid of a shaped guide 16, it is inserted between the too shaping rollers—the top one 17 being movable and the bottom one 18 being stationary. During this stage, rollers 17 and 18 are temporarily separated, because the pressure is relieved from cylinder 19 which normally transmits its load to the movable roller 17 by means of an equalizer 20, pivotally mounted at 21.

After the rollers 17 and 18, the strip of insulating paper is pulled inside guides 22 toward the cutting area.

The above-described initial paper insertion is carried out manually by means of handle 23 (FIG. 1) which is fitted to a power supply motor axis.

The rollers 17 and 18, pushed one against the other by operation of cylinder 19, emboss or incise the insulating material and pull it forward.

When the machine is started, cylinder 24 extends, and by means of a mechanism consisting of rack 25, gear wheel 26, and electromagnetic clutch 27, connects gear wheel 26 to driving and shaping rollers 17 and 18. The stroke of the rack stem 25 of cylinder 24 can be chocked by means of a set of stops 28 all fitted to revolving head 29, and turned into position either manually or automatically. The operative stop 28 is changed by rotating head 29, thereby adjusting the length of the insulating material ultimately supplied to the stator slot. The machine may also be fed with wider insulating paper than required by the stator slot dimensions, because rollers 30 are provided for trimming the paper strip to the required width.

Rollers 17 and 18 emboss or incise the paper and push it into guide 22 which includes a curve for forcing the paper into a vertical alignment until it reaches cutting knife 31 which is disposed horizontally and driven by cylinder 32. The cut paper falls into guide 33 and then is formed into the proper shape for insertion in the stator 35 by means of the unidirectional shaping unit 34 which will be described further on. In the meantime, a stator 35 to be insulated is lifted from the paper insertion area, and centered by an appropriate fixture 36.

At this point the shaped insulating paper is inserted into the stator slot by needle-type pusher 37. At the end of this operation, the stator makes a 180° rotation and the operation is repeated.

Figure 5:
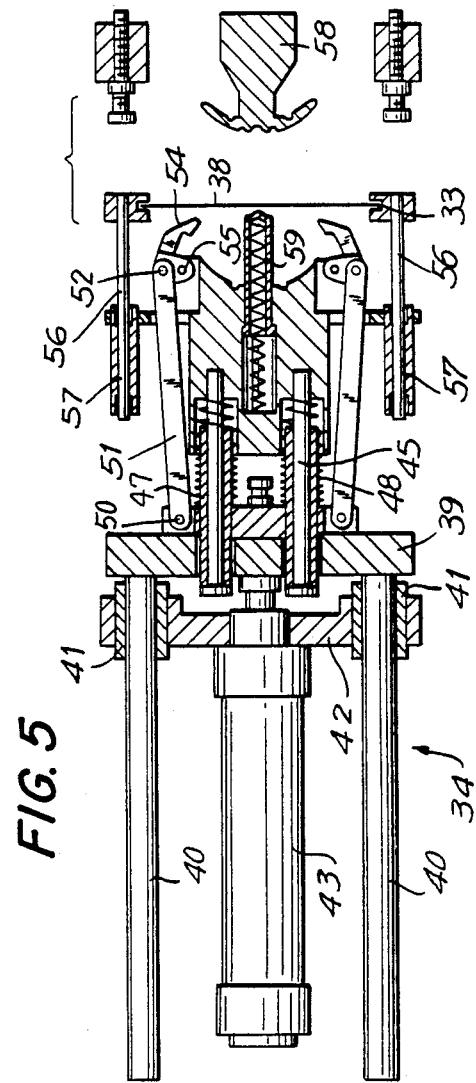
FIGS. 5, 6, and 7 are enlarged views taken along the line V—V in FIG. 2 showing three different stages in the operating cycle of the machine.
Figure 6:
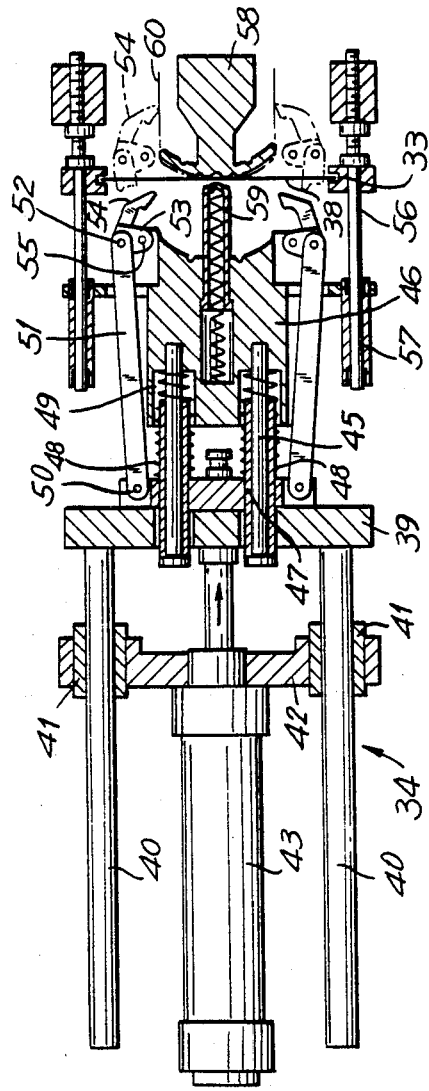
Figure 7:
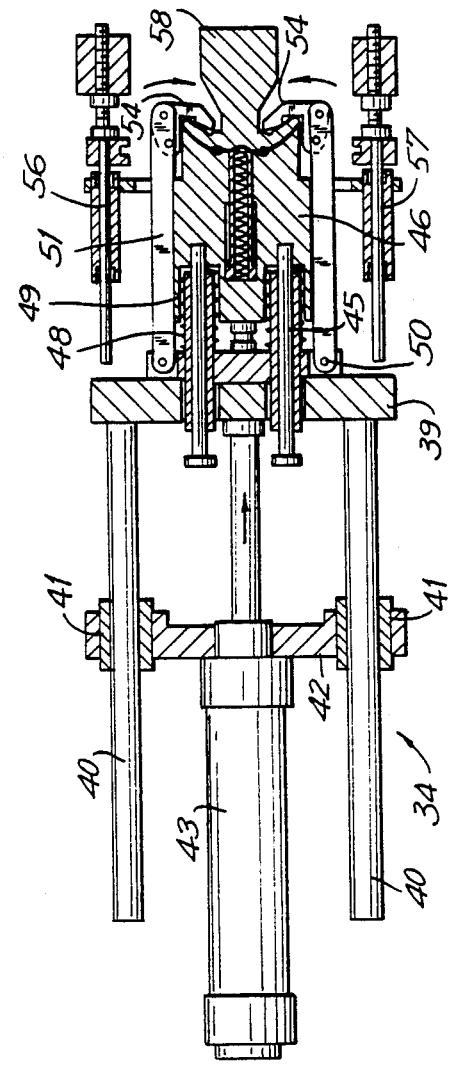

Shaping unit 34 is shown in more detail in FIGS. 5, 6, and 7. It comprises a plate 39 equipped with sliding rods 40 disposed in bushings 41 of a stationary frame 42. An actuator cylinder 43 is integral with frame 42, and the stem 44 of the actuator is integral with plate 39.

Plate 39 is equipped with pins 45 connecting it to body 46. Pins 45 are disposed in bushings 47 which are externally equipped with springs 48 that end in recesses 49 in body 46 where pins 45 are inserted. This assures smooth elastic coupling between body 46 and plate 39.

Arms 51 are hinged at 50 to plate 39, and the arms are also hinged at 52 to small plates 53 equipped with forming means 54. Plates 53 are hinged at 55 to body 46.

The already cut insulating material 38 is now inside guides 33. Sliding rods 56 run inside guides 57 which are integral with body 46. When forming unit 34 is advanced by cylinder 43, insulating material 38 initially touches the top of male former 58 as shown in FIG. 6. Then, as forming unit 34 continues to advance, the insulating material is held in the center by elastic central snug 59, projecting from body 46, and giving the paper the configuration 60 (dashed line in FIG. 6) with the help of the forming means 54 hinged at 52 and 53 and still open. In response to further advancement of unit 34 (FIG. 7), forming means 54 rotate in order to give the insulating material the final shape, pushing it over former 58.

Figure 3:
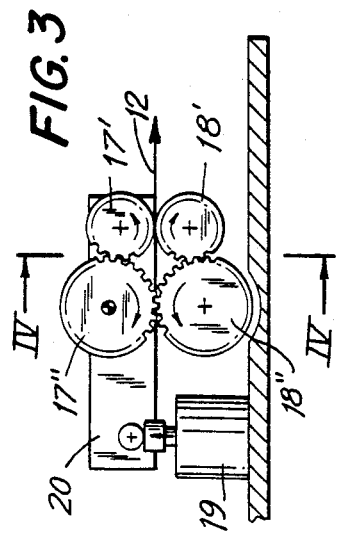
FIG. 3 is an enlarged view of a detail of FIG. 2.

The lower stationary roller 18 and the higher, movable roller 17 ensure both paper feed and embossing. They operate as follows:

Gear wheel 18" (FIGS. 3 and 4) is integral with wheel 26. Accordingly, gear wheel 18" is rotated by the mechanism comprising cylinder 24, rack 25, gear wheel 26, and the electromagnetic clutch previously described.

Gear wheel 18" rotates gear 18' nnd roller 18 with which gear 18' is integral. In addition, gear wheel 18" rotates gear 17", gear 17', and movable roller 17. Gear 17" is rotatable about axis 21, which is the pivotal axis of equalizer 20. Thus this gear system assures constant precision, independent of the thickness of the insulating material used. Indeed, the mesh among the gear wheels 17', 17", 18', and 18" is always ensured, even if the inclination of equalizer 20 or the contact pressure between rollers 17 and 18 is varied.

The pressure required for the embossing i kept constant over the entire width of the insulating material by the action of cylinder 19 which forces roller 17 downwards by means of equalizer 20 which, as has been mentioned, pivots on the same axis as gear 17", and also due to the fact that the roller is assembled o self-aligning bearings 9.

We claim:

1. Machine for forming insulating paper for electric motor stators and for vertically inserting the formed paper into the stator directly on the transportation system wherein the paper is fed from a feeding coil placed upstream of the machine, said machine comprising:
   a pair of rollers for trimming the paper to the required dimension transverse to the paper feeding direction;
   a pair of paper shaping and pulling rollers for embossing the paper, at least one of said shaping and pulling rollers being motor-operated and the other being movable away from the first one during insertion of the paper into the machine;
   means for cutting the paper transverse to the paper feeding direction, said means for cutting operating in a substantially horizontal direction;
   means for bending the cut paper around a vertically oriented former, said means for bending operating parallel to said means for cutting; and
   means for inserting the cut and bent paper into a stator slot, said means for inserting operating in a vertical direction and moving through said paper bending means.

2. Machine according to claim 1 wherein the motor-driven shaping and pulling roller is connected to a gear wheel which can be manually rotated for the manual insertion of the paper between the two shaping and pulling rollers; and wherein the gear wheel meshes with a rack which constitutes the stem of a cylinder with adjustable stroke for automatic paper feedbetween said shaping and pulling rollers.

3. Machine according to claim 1 wherein the shaping and pulling roller which can be moved away from the motor-driven roller is supported by an equalizer hinged to the machine and rotating under the thrust of a cylinder stem, rigidly connected to the equalizer in order to alternately move the movable roller toward or away from the motor driven roller.

4. Machine according to claim 2 wherein the motor-driven roller receives the rotating motion through a third gear wheel which meshes with a second gear keyed to the axis of the gear wheel that can be manually rotated and meshes with the cylinder stem 5. Machine according to claim 3 wherein the movable shaping and pulling roller is connected to a fourth gear wheel which is rotatable about the hinging axis of the equilizer.

6. Machine according to claim 2 wherein the stroke of the rack stem of the cylinder is adjustable by means of stops of various length supported by a revolving head in order to align a selected one of said stops with the moving axis of tee stem.

7. Machine according to claim 1 wherein said means for forming the cut paper comprises a plate movable by a cylinder along horizontal guides, the plate being equipped with arms hinged to it for rotation about vertical axes at the end of the plate for bending the paper around projections of said former reproducing the stator slot profile.

8. Machine according to claim 7 wherein the plate carrying the arms is connected by elastic means to sliding rods travelling along said horizontal guides which are integral with the stem of the cylinder, in order to obtain an elastically yielding coupling with the forming body for preforming the insulating material.

9. The method of forming insulating paper for electric motor stators and vertically inserting the formed paper into the stator directly on the transportation system wherein the paper is fed from a feeding coil placed upstream of the location at which it is inserted into the stator, said method comprising the steps of:
   trimming the paper to the required dimension transverse to the paper feeding direction by passing the paper between a pair of rollers;
   embossing the paper by passing it between a pair of paper shaping and pulling rollers, at least one of said shaping and pulling rollers being motor-operated and the other being movable away from the first one during insertion of the paper into the machine;

cutting the paper transverse to the paper feeding direction, said cutting operation taking place in a substantially horizontal direction;

bending the cut paper around a vertically oriented former, said bending operation taking place parallel to said cutting operation; and inserting the cut and bent paper into a stator slot, said inserting operation taking place in a vertical direction and moving the cut and bent paper vertically past said vertically oriented former.

* * * * *